(12) United States Patent  
Litschel et al.

(10) Patent No.: US 6,247,400 B1
(45) Date of Patent: Jun. 19, 2001

(54) APPARATUS FOR PRODUCING ELEVATIONS WHICH CAN BE DETECTED IN A TACTILE MANNER

(75) Inventors: Dietmar Litschel, Klosterneuburg; Claus Herza, Perchtoldsdorf, both of (AT)

(73) Assignee: Caretec GmbH, Vienna (AT)

( * ) Notice: Subject to any disclaimer, the term of this patent is extended or adjusted under 35 U.S.C. 154(b) by 0 days.

(21) Appl. No.: 09/399,484

(22) Filed: Sep. 17, 1999

(30) Foreign Application Priority Data

Sep. 17, 1998 (AT) .................................................... 1564/98

(51) Int. Cl.[7] ....................................................... B41J 3/32
(52) U.S. Cl. ....................... 101/18; 400/109; 400/109.1; 400/127; 400/129; 400/134
(58) Field of Search ....................... 101/18, 3.1; 400/109, 400/109.1, 127, 129, 131, 132, 134, 134.2, 134.1

(56) References Cited

U.S. PATENT DOCUMENTS

| | | | |
|---|---|---|---|
| 4,079,825 | * | 3/1978 | Fewell ..................................... 101/18 |
| 4,501,507 | * | 2/1985 | Peddinghaus ............................ 101/4 |
| 5,015,106 | * | 5/1991 | Robertson et al. ................... 400/127 |
| 5,451,112 | * | 9/1995 | Ito ........................................ 400/212 |

FOREIGN PATENT DOCUMENTS

| | | |
|---|---|---|
| 388331 | 6/1989 | (AT) . |
| 3428065 | 2/1985 | (DE) . |
| 028838 | 5/1981 | (EP) . |
| 524641 | 1/1993 | (EP) . |
| 59-162068 | * 9/1984 | (JP) . |

* cited by examiner

Primary Examiner—Daniel J. Colilla
(74) Attorney, Agent, or Firm—Dykema Gossett PLLC

(57) ABSTRACT

The invention relates to an apparatus for producing elevations which can be detected in a tactile manner on a flat recording medium, with the following components:
at least one stamp with several printing areas which are provided with one or several elevations;
at least one printing plate with several recesses;
a drive device to move the stamp in a recording direction along the recording medium;
an adjusting device to adjust the stamp so as to bring a printing area to a printing position in which the elevations of the respective printing area are opposite of the recesses of the printing plate and
a printing device to press the stamp against the printing plate in order to form one or several recesses on the interposed recording medium which correspond to elevations on the opposite side.

11 Claims, 4 Drawing Sheets

APPARATUS FOR PRODUCING ELEVATIONS WHICH CAN BE DETECTED IN A TACTILE MANNER

BACKGROUND OF THE INVENTION

The present invention relates to an apparatus for producing elevations which can be detected in a tactile manner on a flat recording medium. Apparatuses of this kind are used for example to provide blind or visually impaired persons with the possibility to produce written recordings.

DESCRIPTION OF THE PRIOR ART

So-called braille printers are known in which elevations corresponding to braille characters can be embossed on a recording medium which can be paper or a foil provided for this purpose. In these known apparatuses tappets are used which are provided with several extensible pins whose arrangement corresponds to one or several braille characters. Such apparatuses are known from DE 34 28 065 A, EP 0 524 641 A, EP 0 028 838 A or AT 388 331 B.

Relatively large forces are required to emboss the recording medium. That is why it is necessary in the known apparatuses to equip the pins with respective arresting apparatuses since the force of an electromagnet will generally not suffice to absorb the embossing forces. Such apparatuses are therefore complex, costly and susceptible to malfunctions.

SUMMARY OF THE INVENTION

It is the object of the present invention to provide an apparatus in which the aforementioned disadvantages can be avoided and which in particular allows producing a braille print in a very simple manner. In particular, the apparatus is to be of compact size, inexpensive to produce and versatile in its use.

These objects are achieved in accordance with the invention by an apparatus with the following components:
at least one stamp with several printing areas which are provided with one or several elevations;
at least one printing plate with several recesses;
a drive device to move the stamp in a recording direction along the recording medium;
an adjusting device to adjust the stamp so as to bring a printing area to a printing position in which the elevations of the respective printing area are opposite of the recesses of the printing plate and
a printing device to press the stamp against the printing plate in order to form one or several recesses on the interposed recording medium which correspond to elevations on the opposite side.

The relevant aspect of the invention is that a stamp is used which is movably arranged as an entirety and is not provided with any movable parts in all other respects.

The stamp can be arranged as a cylindrical roller on the circumference of which printing areas are arranged which are provided with different combinations of elevations. The axis of the roller can be arranged parallel or even rectangularly to the recording medium. An embodiment of the present invention is particularly favorable in which the stamp is arranged as a disc which is rotatable about an axis which is arranged substantially normal to the plane of the recording medium. Such a disc is easy to produce by pressure diecasting and only requires little overall height. A further advantage of this solution is that by the movement of the stamp in the recording direction or by the movement of the paper in the feed direction no moments will generally be exerted on the disc when there is a slight contact with the paper. The precision of the positioning is thus further improved. Moreover, the pivot bearings of the disc are not stressed by the printing process, since the respective pressing forces are absorbed by a thrust bearing.

Within the terms of the invention it is both possible to move the stamp towards the printing plate in order to perform a printing process as well to move the printing plate towards the stamp.

It is principally possible to provide a printing plate which extends over the entire width of the recording medium. It is particularly favorable, however, when a further adjusting device is arranged so as to move the printing plate in the recording direction synchronously to the movement of the stamp. In this way it is possible that a deleting function can be simply integrated in the apparatus in accordance with the invention.

In a particularly favorable embodiment of the invention it is provided that the stamp and the drive device are arranged on a rocker and that the printing device is provided with an eccentric in order to move the same towards the recording medium so as to perform a printing process. In this manner the printing process is not performed by an impact as in a large number of other conventional apparatuses, but instead by a substantially sinusoid movement. This allows for a particularly quiet printing process.

By providing elevations with different dimensions it is possible to vary the size of the printed dots. In addition to printing different font sizes or the adaptation to the different qualities of the recording medium, this also ensures an improved representation of images or graphics. Similarly, a different embossing depth can be used advantageously.

BRIEF DESCRIPTION OF THE DRAWINGS

The invention will now be explained in closer detail by reference to the embodiments shown in the drawings, wherein.

DETAILED DESCRIPTION OF THE PREFERRED EMBODIMENTS

Figure 1:
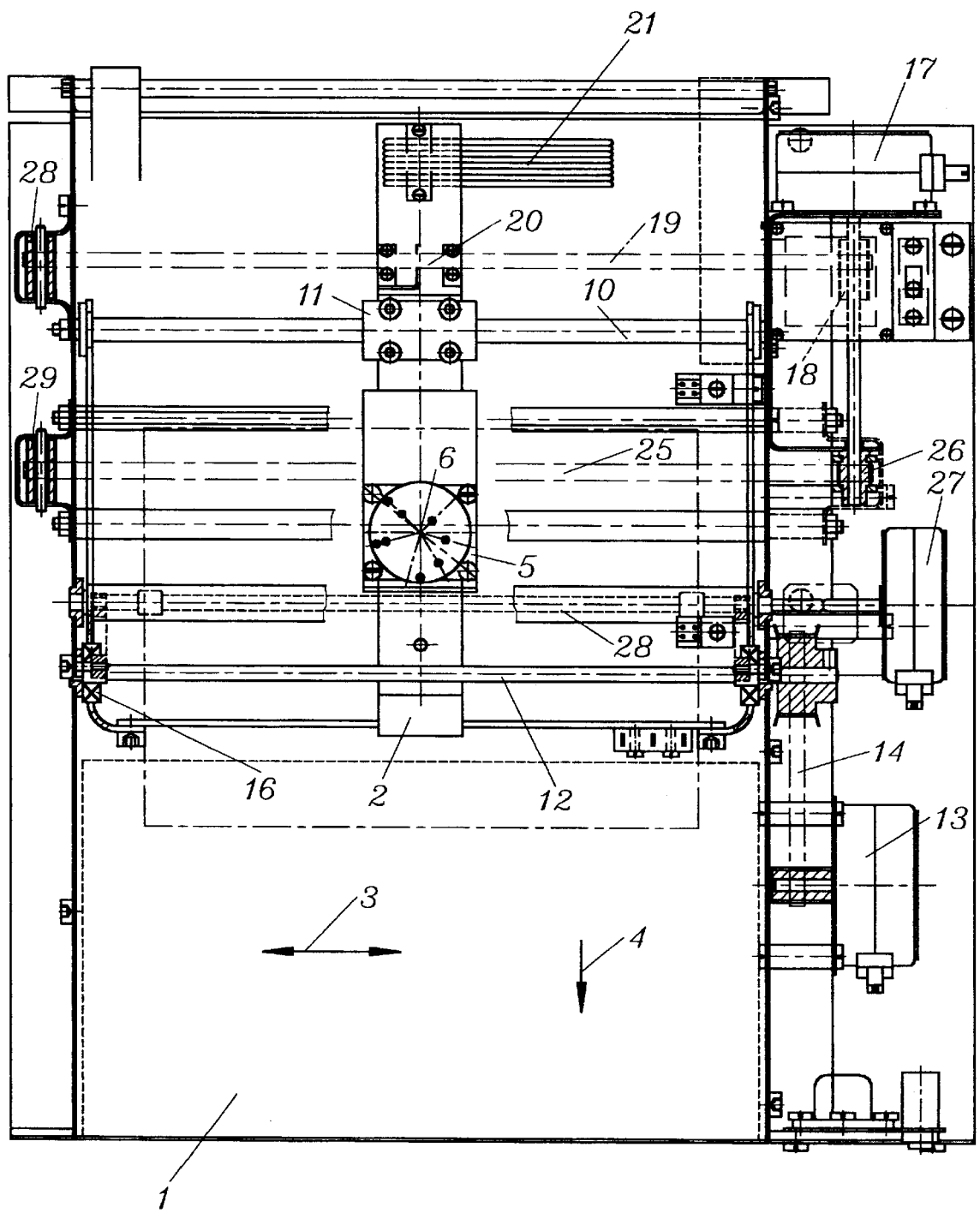
FIG. 1 shows a top view of the apparatus in accordance with the invention with components partly lifted off.

The apparatus in accordance with the invention includes a basic body 1 on which a carriage 2 is movably held in a recording direction which is designated with a double arrow 3. A feed direction for the recording medium (not shown) is designated with the arrow 4. A stamp 5 is fastened to the carriage 2, which stamp is arranged as a pressure diecast component. The stamp 5 is rotatably arranged about a rotational axis 6 which is vertical in the position of normal use. Printing pins 7 are inserted into stamp 5 and are immovably connected. The tips of the printing pins 7 form elevations 8 which project upwardly from stamp 5. Instead of the inserted pins 7 the stamp 5 can be arranged integrally as a pressure diecast component with tip-stretched elevations 8. A stepper motor 9 forming the adjusting device is used for driving the stamp 5 about the axis 6. Carriage 2 is slidably guided on a rod 10 fastened to housing 1, namely by way of a pillow block 11 encompassing the rod 10. A further guidance of the carriage 2 is performed through an eccentric rod 12 on the opposite side of stamp 5. Eccentrics 15 are driven through a stepper motor 13 and a drive belt 14, by means of which the eccentric rod 12 can be lifted and lowered. Rolling bearings 16 are used for the ease of the movement of eccentric 15. A rocker is formed in this manner on which carriage 2 is held. By lifting and lowering the eccentric rod 12, stamp 5 is also lifted and lowered according to the given lever arms in order to perform the printing movement.

Figure 2:
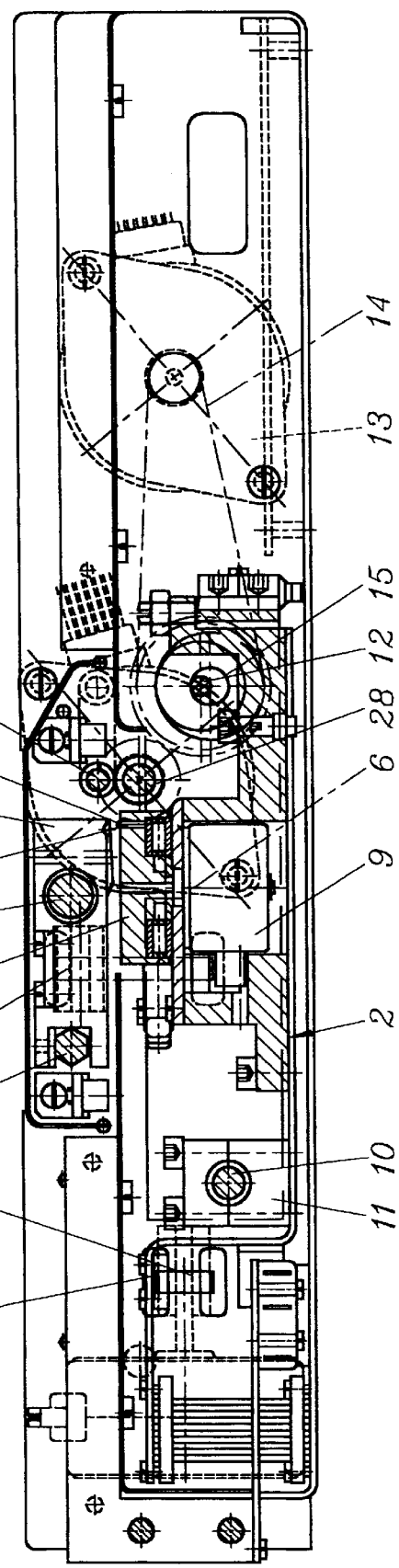
FIG. 2 shows a partial sectional side view through the apparatus of FIG. 1.

The drive of carriage 2 in the direction of recording as indicated by the double arrow 3 is performed by a stepper motor 17 which is attached laterally to the basic body 1. A first belt 19 is driven by way of a first pulley 18, which belt is fastened to carriage 2 at reference numeral 20. These components form the drive device. As a result of the rotation of the stepper motor 17, it is possible to precisely access the individual recording positions in the transversal direction of the recording medium. A trailing cable 21 is used for supplying the stepper motor 9. A printing plate 22 is slidably guided in the direction of feed above the stamp 5 on guide rails 23, 24. The drive is performed by a second belt 25 which is driven through a pulley 26 which is also connected with stepper motor 17. Printing plate 22 has been omitted in FIG. 2 for improving the clarity of the illustration.

Several carriages 2 can be driven by a belt 19 in order to increase the printing speed. In this case a separate stamp 5 is arranged on each carriage, which stamp covers a separate area on the recording medium.

A further stepper motor 27 is used for conveying the recording medium by driving a conveying roller 28 which is coated with rubber. A pressing roller 29 rests on the conveying roller 28 in order to nip the recording medium between the two rollers 28, 29. The common drive of the first belt 19 and the second belt 25 leads to the effect that the carriage 2 and the printing plate 22 move synchronously towards one another. In order to achieve a precise alignment of stamp 5 and printing plate 22, vertical bores can be provided into which positioning pins can be inserted during the adjustment process. In this way it is possible, during an initial setting, to achieve a precise arrangement in true alignment of stamp 5 and printing plate 22. Further pulleys 28 and 29 are used for tensioning the belts 19 and 25.

Figure 3:
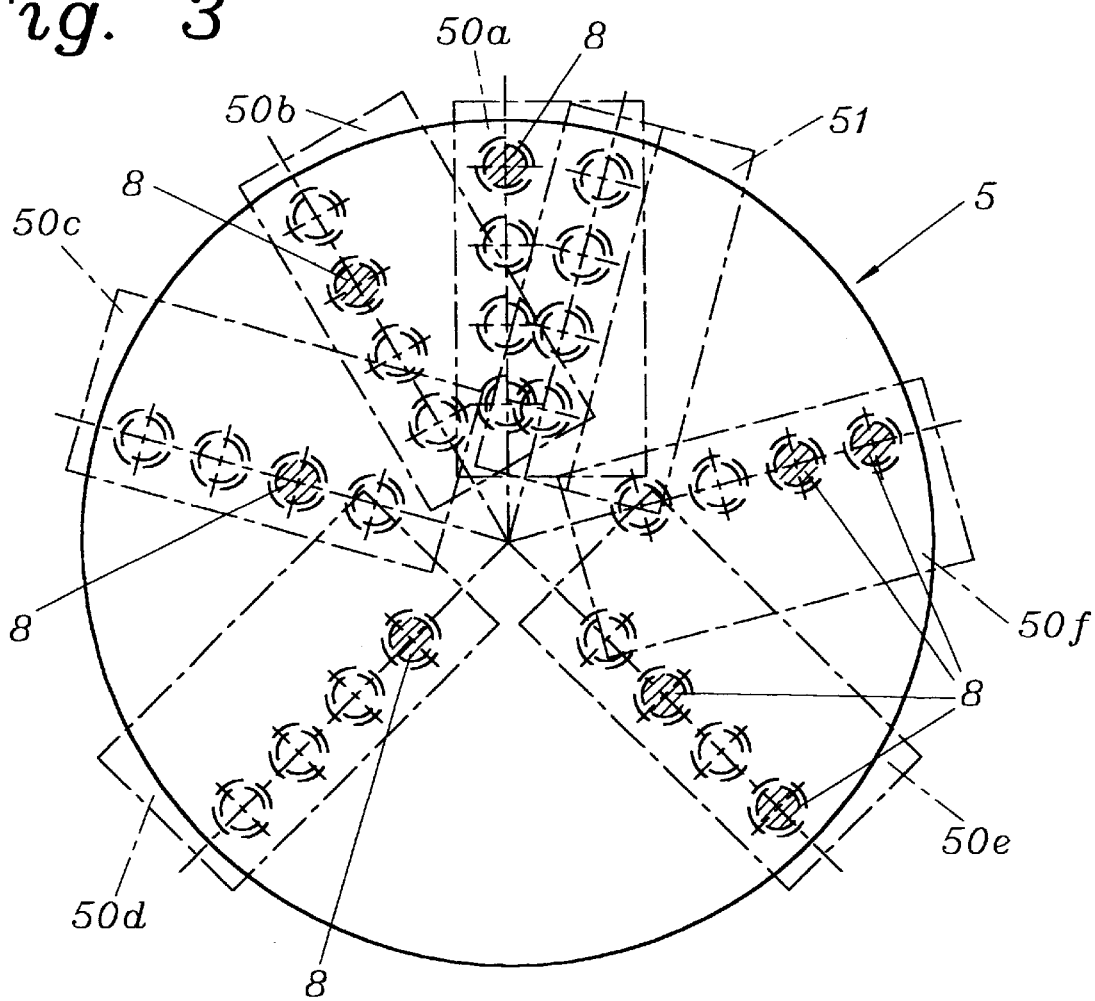
FIG. 3 shows a top view of a stamp.

FIG. 3 shows a view of stamp 5 on an enlarged scale. The printing areas 50a, 50b, 50c, 50d, 50e and 50f are indicated by imaginary dot-dash lines. The printing areas 50a to 50d each include an elevation 8 for placing an individual dot of a braille character. The printing areas 50e and 50f each include two elevations 8 which correspond to frequently occurring combinations of braille dots. One or two dots of a braille character can therefore be printed with a single lifting movement of stamp 5. A maximum of six printing processes are therefore required for a single braille character. Generally, however, one can make do with one to four printing processes. A deletion area 51 is arranged on stamp 5 with a completely smooth surface. FIG. 3 shows that the printing areas 50 to 50f and the deletion area 51 partly overlap one another. The relevant aspect for the function of the apparatus is that each elevation 8 has a certain minimum distance from the other printing areas 50a to 50f.

Figure 4:
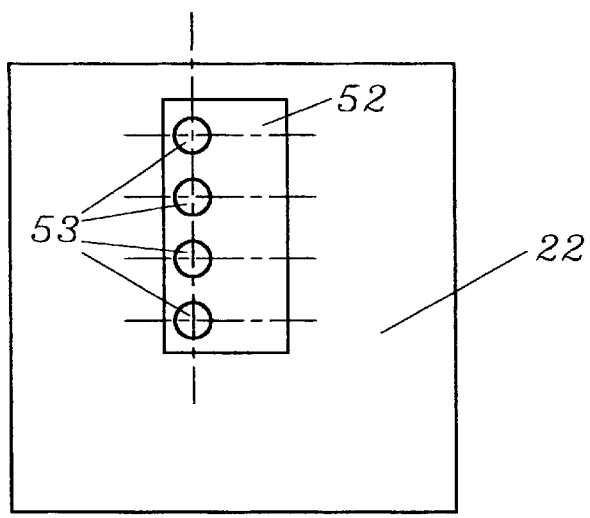
FIG. 4 shows a view of a printing plate from below.

FIG. 4 shows a printing plate 22 in a simplified representation. The printing plate includes a projecting zone 52 whose dimensions correspond to the printing areas 50a to 50f or the deletion area 51. Four recesses 53 are provided for according to the dimensions of the elevations 8 in zone 52.

When printing braille print the carriage 2, and thus also the printing plate 22, are brought to the position by the rotation of the stepper motor 17 where the character is to be printed. By a rotation of the stepper motor 9 one of the printing areas 50a to 50f is then brought to coincide with the elevated area 52 of the printing plate 22. As a result of a respective rotation of the stepper motor 13 the eccentric rod 12 is moved upwardly, so that the elevations 8 will penetrate the recesses 53 by interposing the recording medium. In this way elevations that can be detected in a tactile manner are produced on the recording medium. Optionally, the depth of the penetration can be varied. If the first column of the respective braille character cannot be produced with a single printing process, the stamp 5 is brought to another position by the rotation of stepper motor 9 after the lowering of the carriage 2 in order to print a further braille dot. As two braille dots can be placed simultaneously in the printing areas 50e and 50f, a maximum of three printing processes are required for the production of a single braille column. Thereafter the carriage 2 is moved further by a distance in the recording direction which corresponds to the distance of the two columns of a braille character. Thereafter, the braille dots of the second column of the character are placed by one or several printing processes.

It is also possible with the apparatus in accordance with the invention to delete an already placed braille character. For this purpose the carriage 2 is moved back in the recording direction until the braille dots to be deleted are disposed under the plane portion of the elevated zone 52 of the printing plate 22. Already placed braille dots can be removed again by pressing the deletion area 51 once or several times against the printing plate 22. The question as to how completely or partially this is achieved depends on the respective properties of the recording medium.

Not only braille characters can be written with the apparatus in accordance with the invention. It is also possible to produce graphical illustrations of any kind in a form that can be detected in a tactile manner. Thus, diagrams, curves or the like which can be detected by blind persons can be printed out for example. Similarly, print characters of a respectively large size which can be detected in a tactile manner can be similarly printed out. It is also possible to write on narrow recording media in braille print transversally to the recording direction.

Figure 5:
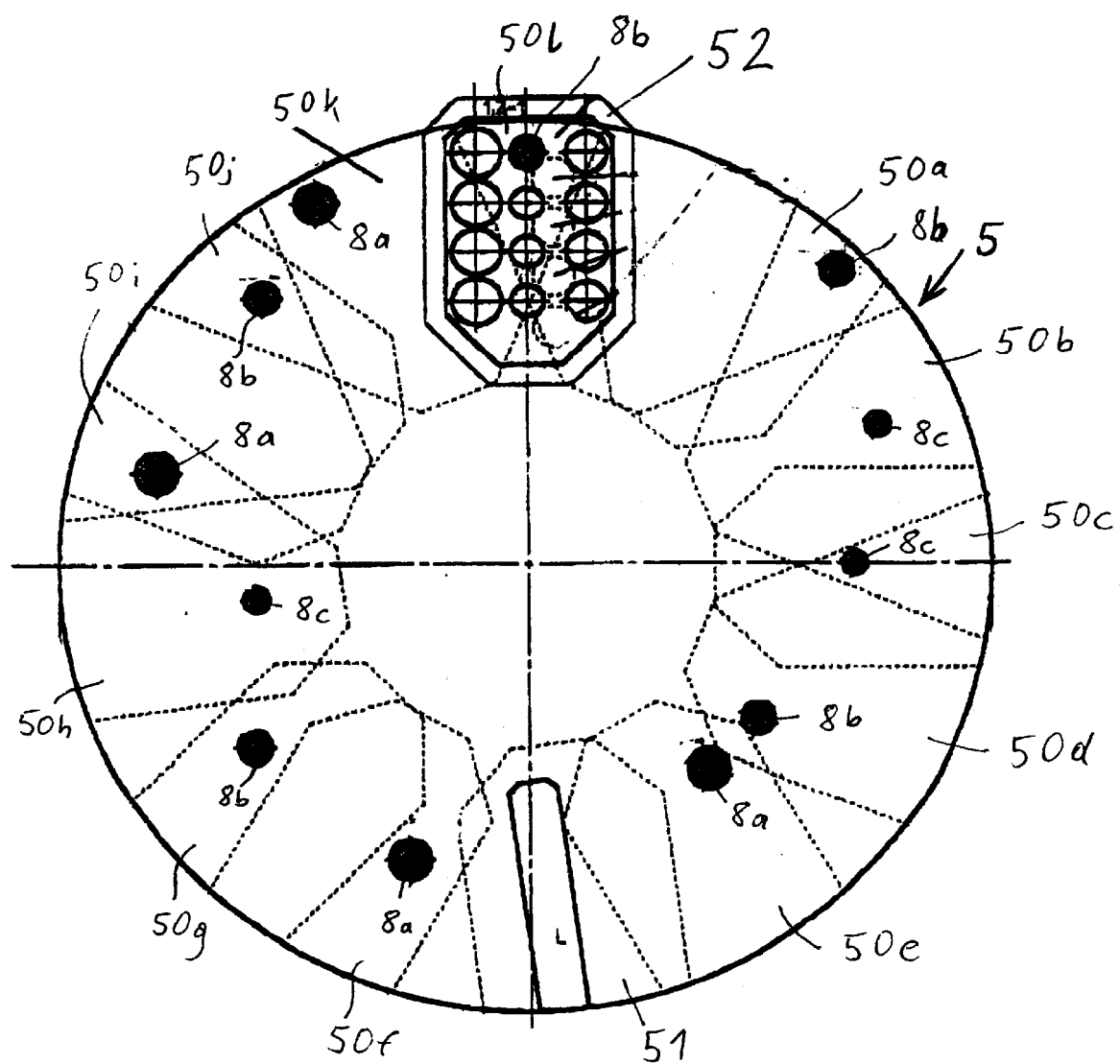
FIG. 5 shows a top view of a stamp in another embodiment of the invention.

Printing areas 50a, 50b, 50c, 50d, 50e, 50f, 50g, 50h, 50i, 50j, 50k, 50l are provided in the stamp of FIG. 5, which areas are each provided with an elevation 8a, 8b, 8c. The elevations 8a are larger than the elevations 8b, and the latter are larger than the elevations 8c. This allows printing dots of different sizes. For better understanding, FIG. 5 also shows the projecting zone 52 of an associated printing plate in which large, medium and small recesses 53a, 53b and 53c are arranged which correspond to the elevations 8a, 8b and 8c. In all other respects this embodiment corresponds to the variant of FIG. 3.

The present invention is not only suitable as a printer which can be connected to a computer or a word processor, it can also be used as an output device of a computer which produces printouts in the form of an addition or typing slip. Moreover, the apparatus in accordance with the invention can also be used as an output unit for games for blind persons. The apparatus can be produced inexpensively and is of compact size. A particular advantage is its low noise emission.

We claim:

1. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and wherein said stamp is in the form of a disk which is rotatable by said second drive apparatus about an axis that is perpendicular to said flat recording medium when positioned between said platen and said stamp.

2. An apparatus according to claim 1, wherein the printing area corresponds substantially to half a character of braille print.

3. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and wherein said stamp is in the form of a roller which is rotatable by said second drive apparatus about an axis that is perpendicular to said flat recording medium when positioned between said platen and said stamp.

4. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and an adjusting device for moving the platen in a recording direction synchronously with movement of said stamp.

5. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and a feed device for moving the planar recording medium perpendicular to a movement direction of said stamp.

6. An apparatus according to claim 5, wherein the feed device is a stepper motor.

7. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first stepper motor for moving said stamp between a first position spaced from said platen and a second position nearer said platen where elevations from a printing area of said stamp can extend into a recess in said printing area of said platen and produce an elevation in a planar recording medium positioned therebetween, a second stepper motor for moving said stamp so that a desired printing area thereof is in register with said printing area of said platen, and a third stepper motor for moving said stamp in a recording direction relative to said recording medium when said stamp is in said first position.

8. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and wherein said stamp and said first drive apparatus are on a rocker and the third drive apparatus includes an eccentric.

9. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and wherein said stamp includes a deletion area which can coincide with a section of said platen which is planar.

10. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations of varying size, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, and a third drive apparatus for moving said stamp in a recording direction relative to said recording medium when said stamp is in said first position.

11. An apparatus for producing elevations in a planar recording medium which can be detected in a tactile manner, said apparatus comprising:

a platen which includes a printing area that defines a portion having a plurality of recesses, a stamp which includes a plurality of printing areas that each define a portion having an arrangement of elevations, a first drive apparatus for moving said stamp between a first position spaced from said platen and a second position nearer said platen where elevations from a printing area of said stamp can extend into a recess in said printing area of said platen and produce an elevation in a planar recording medium positioned therebetween, a second drive apparatus for moving said stamp so that a desired printing area thereof is in register with said printing area of said platen, a third drive apparatus for moving said stamp in a recording direction relative to said recording medium when said stamp is in said first position, and wherein said third drive apparatus operates to form recesses of different height.

* * * * *